Oct. 1, 1935.  J. M. HARGRAVE  2,016,088
SCREW
Filed May 24, 1934
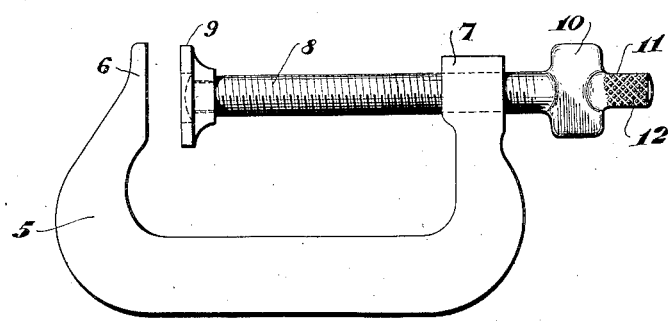
Fig. 1
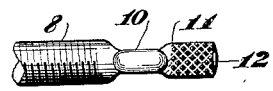 
Fig. 2    Fig. 3
INVENTOR
John M. Hargrave
BY
Wood + Wood
ATTORNEYS Patented Oct. 1, 1935

2,016,088

UNITED STATES PATENT OFFICE 2,016,088

SCREW

John M. Hargrave, Cincinnati, Ohio

Application May 24, 1934, Serial No. 727,314

1 Claim. (Cl. 85—9)

This invention relates to an improved clamping screw and particularly to the structure of the grip end thereof. In the manipulation of a clamping screw there are two phases of movement. The first phase may be designated as the approach movement and the second phase as the actual clamping or pressure applying movement.

In the first named movement it is desirable to be able to manipulate the screw for quick rotation or rapid adjustment, whereas in the second named movement, speed of rotation is less important, the prime consideration being the ability to apply relatively great pressure manually or through the use of a wrench.

Accordingly, it is the object of this invention to provide an improved clamping screw which is of highly improved construction for the reason that it enables the operator to make a rapid approach adjustment through manipulation, and after the operator has brought the clamping screw against the work enables him to apply greater or clamping pressure either manually or through the use of a wrench. It also permits the more delicate application of light clamping pressure which is sometimes desirable. In other words, the grip end of the screw incorporates structures alternately useable, depending on the position of the screw relative to the work and the character of the work.

Other objects and further advantages will be more fully set forth in a description of the accompanying drawing in which:

Figure 1 is a side elevation of a clamp incorporating the improved screw.

Figure 2 is a fragmentary view of the grip end of the screw viewing the screw at right angles to the view shown in Figure 1.

Figure 3 is an end view taken at the grip end of the screw.

The present improvement is entirely concerned with the construction of a screw and has particular application to a clamping screw. For this reason the drawing discloses a clamp, particularly a small hand clamp, which environment is typical and illustrates the functions of the improvement.

Referring to the drawing, the body of the clamp is indicated at 5. This body is of C shape providing a pad 6 at the end of one arm thereof, and a screw journal lug 7 at the end of the other arm thereof. The pad faces the lug and the lug is provided with a screw-threaded bore, the axis of which intersects the center of the pad. The screw is indicated at 8, being threaded through the screw-threaded bore of the clamp body and carrying the adjustable pad 9 of the clamp at its inner end adjacent the fixed pad of the clamp body. The adjustable pad is loosely mounted so as to be free to adjust itself to variations in the contour of the work against which it is engaged.

The outer end or grip end of the screw is of the following construction. Broadly speaking, there are two grip portions, namely, a flattened or diametrically disposed portion 10 and a roughened cylindrical portion 11 beyond the flattened portion. In other words, the roughened portion is in the form of a stud or pilot extended axially at the extreme end of the screw beyond the flattened portion. This extended stud or cylindrical grip portion is shown with its outer periphery knurled as at 12, as exemplary of one form of roughening which would enable the operator to obtain a good frictional contact with this portion between the fingers. The operator uses this cylindrical portion for the purpose of rapidly spinning or rotating the screw 7 to the work, that is, in the approach phase of movement.

With the screw against the work or the work clamped between the respective pads, it is then desirable to apply greater or clamping pressure. At this time the operator manually makes use of the flattened portion for the purpose of greater leverage, or if extreme pressure is desired, applies a standard wrench across the flattened portion. The wings provided by the flattened portion extend out far enough to provide ample leverage and length of surface for convenient application of pressure either through the fingers or a wrench.

Having described my invention, what I claim is:

An improved screw element, including, a screw-threaded portion, an axially disposed grip portion extended therefrom, and a pressure applying head portion formed as an integral part of the screw between the screw-threaded portion and the axially disposed grip portion, said head portion being formed from the material of the element and flattened to provide wings extending laterally thereof.

JOHN M. HARGRAVE.